US006662705B2

(12) United States Patent
Huang et al.

(10) Patent No.: US 6,662,705 B2
(45) Date of Patent: Dec. 16, 2003

(54) ELECTRO-HYDRAULIC VALVE CONTROL SYSTEM AND METHOD

(75) Inventors: Xiaodong Huang, Peoria, IL (US); Stephen Victor Lunzman, Chillicothe, IL (US)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 65 days.

(21) Appl. No.: 10/006,885

(22) Filed: Dec. 10, 2001

(65) Prior Publication Data

US 2003/0106313 A1 Jun. 12, 2003

(51) Int. Cl.[7] ............................................. F16D 31/02

(52) U.S. Cl. ............................ 91/433; 91/459; 60/459; 60/461

(58) Field of Search .................... 91/459, 433; 60/459, 60/461

(56) References Cited

U.S. PATENT DOCUMENTS

| | | | | |
|---|---|---|---|---|
| 3,987,625 A | | 10/1976 | Swatty et al. | |
| 4,222,409 A | | 9/1980 | Budzich | |
| 4,327,627 A | | 5/1982 | Budzich | |
| 4,694,731 A | | 9/1987 | Budzich | |
| 4,747,335 A | | 5/1988 | Budzich | |
| 4,796,661 A | | 1/1989 | Hishinuma et al. | |
| 4,967,557 A | | 11/1990 | Izumi et al. | |
| 5,138,838 A | * | 8/1992 | Crosser | 60/461 |
| 5,150,574 A | | 9/1992 | Hirata et al. | |
| 5,285,642 A | | 2/1994 | Watanabe et al. | |
| 5,297,381 A | | 3/1994 | Eich et al. | |
| 5,307,631 A | | 5/1994 | Tatsumi et al. | |
| 5,537,819 A | * | 7/1996 | Kobayashi | 60/459 |
| 5,897,287 A | | 4/1999 | Berger et al. | |
| 6,467,264 B1 | * | 10/2002 | Stephenson et al. | 91/454 |

* cited by examiner

*Primary Examiner*—Edward K. Look
*Assistant Examiner*—Igor Kershteyn
(74) *Attorney, Agent, or Firm*—Finnegan, Henderson, Farabow, Garrett & Dunner

(57) ABSTRACT

A system and method for controlling an electro-hydraulic valve arrangement to perform a pump check function are provided. The system includes an electro-hydraulic valve arrangement disposed between a source of pressurized fluid and a hydraulic actuator. Pressure sensors are provided to sense a source pressure representative of the fluid pressure between the source of pressurized fluid and the electro-hydraulic valve arrangement and an actuator pressure representative of the fluid pressure between the electro-hydraulic valve arrangement and the actuator. A control device receives a signal to open the electro-hydraulic valve arrangement to provide a requested flow rate to the hydraulic actuator. The received signal is modified to prevent fluid flow through the electro-hydraulic valve arrangement when the source pressure is less than the actuator pressure.

18 Claims, 3 Drawing Sheets

ELECTRO-HYDRAULIC VALVE CONTROL SYSTEM AND METHOD

TECHNICAL FIELD

The present invention is directed to a system and method for controlling an electro-hydraulic valve arrangement. In particular, the present invention is directed to a system and method for controlling an electro-hydraulic valve arrangement to perform a pump check function.

BACKGROUND

Hydraulic actuators, such as piston/cylinder arrangements or fluid motors, are commonly used to move work implements, such as, for example, buckets, shovels, loaders, backhoes, rakes, trenchers, forklifts, etc., that are carried on work machines. The hydraulic actuators provide the power necessary to move the work implement to accomplish an operation. Depending on the type of work implement and the requirements of the work machine, one or more hydraulic actuator may be connected to the work implement.

Each hydraulic actuator typically includes at least two fluid chambers that are disposed on opposite sides of a moveable element. The moveable element of each hydraulic actuator is, in turn, connected to the work implement that is to be moved. The work machine usually carries a pump that is connected to the hydraulic actuator and provides pressurized fluid to one or the other of the fluid chambers of the hydraulic actuator. Typically, an electro-hydraulic valve arrangement is placed in fluid connection between the pump and the hydraulic actuator to control a flow rate and direction of pressurized fluid to and from the fluid chambers.

When it is desirable to move the work implement in a certain direction, the electro-hydraulic valve arrangement is moved to place the pump in fluid connection with one chamber of the hydraulic actuator at the same time that fluid is allowed to flow out of the other chamber. This creates a pressure differential over the moveable element of the hydraulic actuator. Provided that the force exerted on the moveable element by the pressurized fluid is great enough to overcome the resistant force of the work implement, the moveable element will move towards the area of lower fluid pressure existing in the opposite chamber of the hydraulic actuator, thereby moving the work implement.

If however, the pressure of the fluid leaving the pump is less than the pressure of the fluid in the hydraulic actuator, the fluid will tend to flow from the actuator towards the pump, i.e. in a reverse direction. If the fluid were allowed to flow unchecked, the moveable element of the hydraulic actuator would move in an undesirable manner.

Typically, as shown in U.S. Pat. No. 4,967,557, a mechanical check valve is disposed in the fluid connection between the pump and the electro-hydraulic valve arrangement. The mechanical check valve is a spring loaded valve that only allows fluid to flow in one direction, e.g., from the pump to the electro-hydraulic valve arrangement. When the pressure differential over the check valve is positive, i.e. the pressure of the fluid on a first side of the valve is greater that the pressure of the fluid on the opposite side of the valve, the force of the fluid will overcome the spring force and open the check valve. If, however, the pressure of the fluid on the first side of the valve is less than the pressure on the opposite side of the valve, the valve will close and prevent fluid from flowing through the valve.

The use of mechanical check valves to perform the pump and load check functions may be disadvantageous to the overall system. For instance, each mechanical check valve may add cost to the overall system. In addition, the inclusion of a mechanical check valve may increase the size of the overall system.

The present invention provides a system and method for controlling an electro-hydraulic valve arrangement that solves all or some of the problems set forth above.

SUMMARY OF THE INVENTION

To attain the advantages in accordance with the purposes of the invention, as embodied and broadly described herein, the invention is directed to a method of controlling an electro-hydraulic valve arrangement that is disposed in fluid connection between a source of pressurized fluid and an actuator. According to the method, a signal is received to open the electro-hydraulic valve arrangement to provide a flow of fluid from the source of pressurized fluid to the actuator. A source pressure that is representative of the pressure of fluid between the source of pressurized fluid and the electro-hydraulic valve arrangement is determined. An actuator pressure that is representative of the pressure of the fluid between the electro-hydraulic valve arrangement and the actuator is also determined. The generated signal is modified to prevent the electro-hydraulic valve arrangement from opening when the source pressure is less than the actuator pressure to prevent a reverse flow of fluid from the actuator to the source of pressurized fluid.

In another aspect, the invention is directed to a system for controlling a hydraulic actuator that includes a hydraulic actuator and a source of pressurized fluid. An electro-hydraulic valve arrangement is positioned in fluid connection with the source of pressurized fluid and the hydraulic actuator and is operable to control a flow rate of fluid from the source of pressurized fluid to the hydraulic actuator. A first pressure sensor senses a source pressure that is representative of the pressure of the fluid between the source of pressurized fluid and the electro-hydraulic valve arrangement. A second pressure sensor senses an actuator pressure that is representative of the pressure of the fluid between the electro-hydraulic valve arrangement and the hydraulic actuator. A control device receives a signal to open the electro-hydraulic valve arrangement and prevents the electro-hydraulic valve arrangement from opening when the source pressure is less than the actuator pressure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

A system and method for controlling an electro-hydraulic valve arrangement is provided. The electro-hydraulic valve arrangement is used to control a flow of pressurized fluid to a hydraulic actuator. In the currently contemplated embodiment and as illustrated in the figures, the hydraulic actuator is a piston cylinder combination. However, the hydraulic actuator may be another type of actuator, such as, for example, a fluid motor. An exemplary embodiment of a control system for an electro-hydraulic valve arrangement is illustrated in FIG. 1 and is generally designated by the reference number 10.

In the accompanying figures, a single electro-hydraulic valve arrangement and actuator combination is illustrated. However, the system and method described herein are equally applicable to hydraulic circuits that include multiple electro-hydraulic valve arrangement and actuator combinations.

Figure 1:
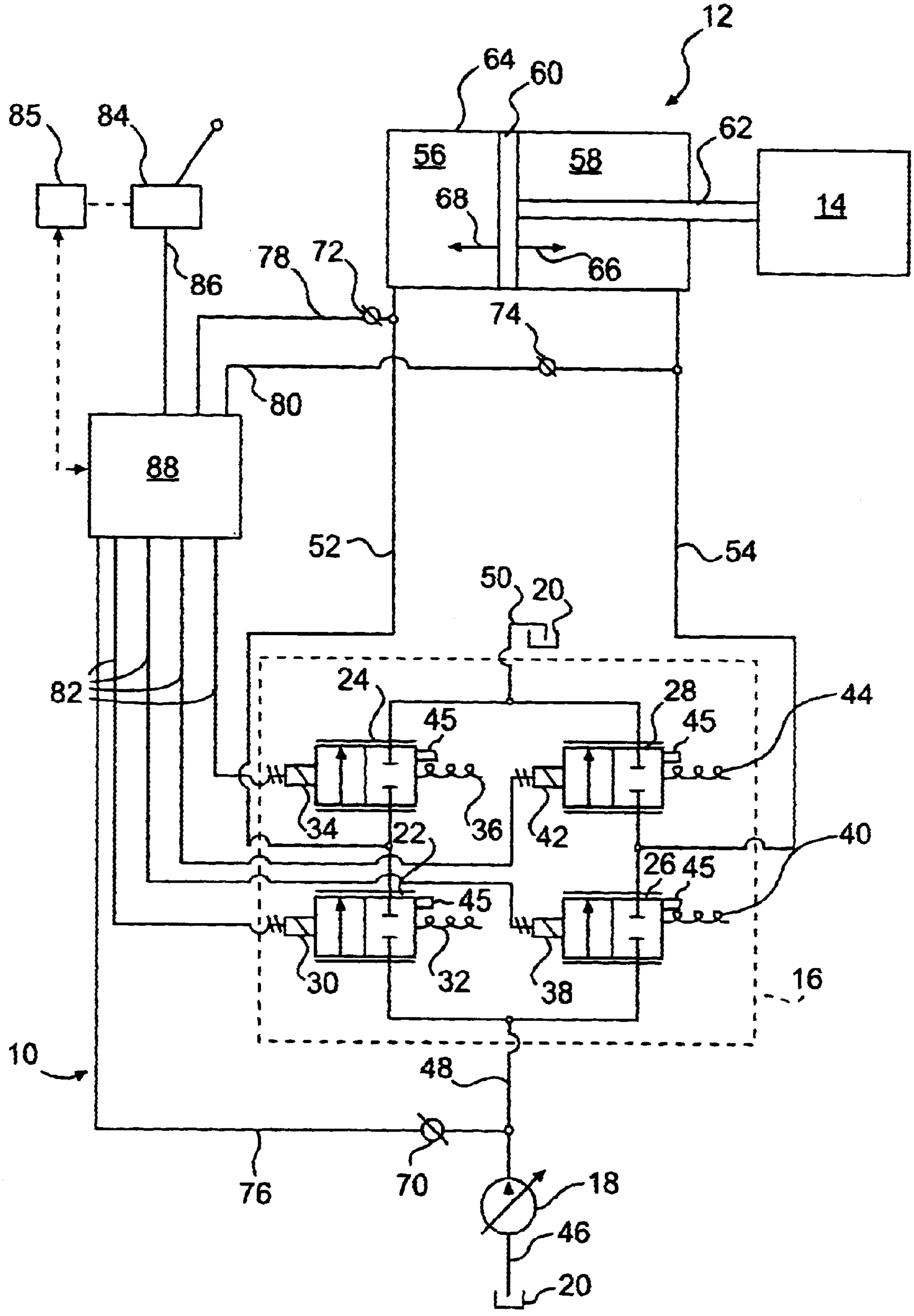
FIG. 1 is a schematic and diagrammatic illustration of a control system in accordance with one embodiment of the present invention.

As shown in FIG. 1, control system 10 is connected to a hydraulic actuator 12, which includes a housing 64 containing a piston 60. Piston 60 is slidably received in housing 64 for movement in a first direction (as indicated by arrow 66) and in a second direction (as indicated by arrow 68). Piston 60 is connected to a piston rod 62, which extends through housing 64 and is connected to a load 14.

It is contemplated that load 14 may be an implement of a work machine, such as, for example, a bucket, fork, or other earth or material moving implement. These types of work machines may include, for example, wheel loaders, track type loaders, and hydraulic excavators.

Also shown in FIG. 1 is housing 64 that defines a first chamber 56 on one side of piston 60 and a second chamber 58 on the opposite side of piston 60. Both the first chamber 56 and the second chamber 58 are configured to receive and hold a pressurized fluid. Piston rod 62 extends through second chamber 58 and housing 64.

A source of pressurized fluid is provided to supply pressurized fluid to the hydraulic actuator. It is contemplated that the source of pressurized fluid may be a pump 18 of any variety readily apparent to one skilled in the art, such as, for example, a piston pump, gear pump, vane pump, or gerotor pump. In the currently contemplated embodiment, the pump is a variable capacity pump, although it is contemplated that the pump may be a fixed capacity pump with a bypass valve.

As illustrated in FIG. 1, pump 18 is placed in fluid connection with a tank 20 through fluid line 46. Tank 20 contains a supply of fluid at an ambient pressure. Pump 18 is also connected to fluid line 48, which leads to an electro-hydraulic valve arrangement 16.

Electro-hydraulic valve arrangement 16 is placed in fluid connection between pump 18 and hydraulic actuator 12. Electro-hydraulic valve arrangement 16 is selectively operable to fluidly connect one of the first and second chambers 56, 58 of hydraulic actuator 12 with pump 18 while fluidly connecting the other of the first and second chambers with the tank. Electro-hydraulic valve arrangement 16 may also be closed to prevent fluid from flowing into or out of either the first chamber or the second chamber.

As illustrated in FIG. 1, electro-hydraulic valve arrangement 16 is connected to pump 18 through fluid line 48 and to tank 20 through a fluid line 50. Electro-hydraulic valve arrangement 16 includes four independent metering valves 22, 24, 26, and 28. Other types of electro-hydraulic valve arrangements, such as, for example, split spool valves and three-position electro-hydraulic valves may also be used.

As also shown in FIG. 1, electro-hydraulic valve arrangement 16 is placed in fluid connection with hydraulic actuator 12 through fluid lines 52 and 54. Specifically, first metering valve 22 and second metering valve 24 are connected to first chamber 56 of hydraulic actuator 12 through fluid line 52. Third metering valve 26 and fourth metering valve 28 are connected to second chamber 58 of hydraulic actuator 12 through fluid line 54. In the currently contemplated embodiment, each independent metering valve is a proportional valve, i.e. is operable to allow a variable flow rate of fluid to flow therethrough. The fluid flow rate that is allowed to flow through a particular valve depends upon system and load requirements.

As further illustrated in FIG. 1, first independent metering valve 22 controls the rate at which pressurized fluid flows from pump 18 to first chamber 56. Second independent metering valve 24 controls the rate at which fluid flows from first chamber 56 to tank 20. Third independent metering valve 26 controls the rate at which fluid flows from pump 18 to second chamber 58. Fourth independent metering valve 28 controls the rate at which fluid flows from second chamber 58 to tank 20.

First metering valve 22 includes a first solenoid 30. In the disclosed embodiment, energizing first solenoid 30 acts on first metering valve 22 to move the valve towards an open position to place first chamber 56 in controlled fluid connection with pump 18. A first spring 32 also acts on first metering valve 22 to return first metering valve 22 to a closed position when first solenoid 30 is de-energized.

Second metering valve 24 includes a second solenoid 34. In the disclosed embodiment, energizing second solenoid 34 acts on second metering valve 24 to move the valve towards an open position to place first chamber 56 in controlled fluid connection with tank 20. A second spring 36 also acts on second metering valve 24 to return the valve to a closed position when second solenoid 34 is de-energized.

Third metering valve 26 includes a third solenoid 38. In the disclosed embodiment, energizing third solenoid 38 acts on third metering valve 26 to move the valve towards an open position to place second chamber 58 in controlled fluid connection with pump 18. A third spring 40 also acts on third metering valve 26 to return the valve to a closed position when third solenoid 38 is de-energized.

Fourth metering valve 28 includes a fourth solenoid 42. In the disclosed embodiment, energizing fourth solenoid 42 acts on fourth metering valve 28 to move the valve towards an open position to place second chamber 58 in controlled fluid connection with tank 20. A fourth spring 44 also acts on fourth metering valve 28 to return the valve to a closed position when fourth solenoid 42 is de-energized.

In this embodiment, the motion of hydraulic actuator 12 is controlled by selectively and controllably opening and closing independent metering valves 22, 24, 26, and 28. In standard operation, to move hydraulic actuator 12 in a first direction (as illustrated by arrow 66), first metering valve 22 and fourth metering valve 28 are controllably opened at the same time by energizing first solenoid 30 and fourth solenoid 42. This places first chamber 56 in connection with pump 18 and second chamber 58 in connection with tank 20. This configuration allows pressurized fluid to flow to first chamber 56 and also allows displaced fluid to flow from second chamber 58 to tank 20. The pressurized fluid entering first chamber 56 exerts a force on piston 60 to move load 14 in the first direction (as indicated by arrow 66). When the operation is complete, first solenoid 30 and fourth solenoid 42 are de-energized, thereby allowing first spring 32 and fourth spring 44 to return first metering valve 22 and fourth metering valve 28 to their closed positions.

Similarly, to move hydraulic actuator 12 in a second direction (as illustrated by arrow 66) second metering valve 24 and third metering valve 26 are controllably opened at the same time by energizing second solenoid 34 and third solenoid 38. This places second chamber 58 in connection with pump 18 and first chamber 56 in connection with tank 20. This configuration allows pressurized fluid to flow to second chamber 58 and also allows displaced fluid to flow from first chamber 56 to tank 20. The pressurized fluid entering second chamber 58 exerts a force on piston 60 to move load 14 in the second direction (as indicated by arrow 68). When the operation is complete, second solenoid 34 and third solenoid 38 are de-energized, thereby allowing second spring 36 and third spring 40 to return second metering valve 24 and third metering valve 26 to their closed positions.

A first pressure sensor 70 is provided to sense a source, or pump, pressure that is representative of the pressure of the fluid between pump 18 and electro-hydraulic valve arrangement 16. First pressure sensor 70 may be disposed at any point in system 10 that will allow first pressure sensor 70 to sense a fluid pressure that is representative of the pressure of the fluid between pump 18 and electro-hydraulic valve arrangement 16.

As illustrated in FIG. 1, the first pressure sensor 70 is connected to fluid line 48. First pressure sensor 70 senses the pressure of the fluid in fluid line 48, which is representative of the fluid pressure between pump 18 and electro-hydraulic valve arrangement 16. First pressure sensor may be disposed at any point along fluid line 48, including the fluid exit of pump 18 and the fluid inlet of electro-hydraulic valve arrangement 16.

A second pressure sensor 72 or 74 is provided to sense an actuator pressure that is representative of the pressure of the fluid between electro-hydraulic valve arrangement 16 and hydraulic actuator 12. Second pressure sensor 72 or 74 may include one or more pressure sensors disposed in the system to sense the pressure of the fluid between electro-hydraulic valve arrangement 16 and at least one of the first and second chambers 56, 58 of hydraulic actuator 12. Second pressure sensor 72 or 74 may be disposed at any point within system 10 that will allow the pressure sensor to sense a pressure representative of the fluid pressure between electro-hydraulic valve arrangement 16 and at least one chamber 56, 58 of hydraulic actuator 12.

As will be described in greater detail below, the pressures sensed by first pressure sensor 70 and second pressure sensor 72 or 74 are used to determine the pressure difference between the pump pressure and the actuator pressure. As an alternative, a pressure differential sensor may be used to determine the pressure difference between the pump pressure and the actuator pressure. The output of the pressure differential sensor would indicate whether the pump pressure was greater or less than the actuator pressure. The output of the pressure differential sensor may also indicate, in appropriate units, the magnitude of the pressure difference.

As illustrated in FIG. 1, first chamber pressure sensor 72 is connected to fluid line 52 and second chamber pressure sensor 74 is connected to fluid line 54. First chamber pressure sensor 72 senses the pressure of the fluid in fluid line 52, which is representative of the fluid pressure within first chamber 56 and of the fluid pressure between electro-hydraulic valve arrangement 16 and hydraulic actuator 12. Second chamber pressure sensor 74 senses the pressure of the fluid in fluid line 54, which is representative of the fluid pressure within second chamber 58 and of the fluid pressure between electro-hydraulic valve arrangement 16 and hydraulic actuator 12.

First chamber pressure sensor 72 and second chamber pressure sensor 74 may be disposed at any point along fluid lines 52 and 54 or may be connected directly to first chamber 56 and second chamber 58, provided that the sensed pressures are representative of the fluid pressure between electro-hydraulic valve arrangement 16 and the respective chamber 56, 58 of hydraulic actuator 12. First chamber pressure sensor 72 and second chamber pressure sensor 74 may also be disposed at the outlet of electro-hydraulic valve arrangement 16, such as at the outlets of first independent metering valve 22 and third independent metering valve 26.

A control device 88 is provided to govern the position of electro-hydraulic valve arrangement 16 and thereby control the rate and direction of fluid flow to hydraulic actuator 12. In response to a received signal to open electro-hydraulic valve arrangement 16 to provide a requested flow rate of fluid to hydraulic actuator 12, control device 88 will prevent electro-hydraulic valve arrangement 16 from opening when the pump pressure is less than the actuator pressure. In addition, control device 88 may compute a scaling factor based on the difference between the pump pressure and the actuator pressure. Control device 88 applies the scaling factor to the requested flow rate to determine an actual flow rate of fluid to provide to hydraulic actuator 12 and adjusts the position of electro-hydraulic valve arrangement 16 accordingly. The flowcharts of FIGS. 2 and 3 describe illustrative methods of controlling electro-hydraulic valve arrangement 16.

As illustrated in FIG. 1, control device 88 is connected between a control lever 84 and system 10. Control device 88 preferably includes a computer, which has all components required to run an application, such as, for example, a memory, a secondary storage device, a processor, such as a central processing unit, and an input device. One skilled in the art will appreciate that this computer can contain additional or different components. Furthermore, although aspects of the control system are described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM.

Control device 88 governs the position of electro-hydraulic valve arrangement 16 and thereby controls the rate and direction of fluid flow into and out of hydraulic actuator 12. Control device 88 is connected to first solenoid 30, second solenoid 34, third solenoid 38, and fourth solenoid 42 through control lines 82. By selectively energizing and de-energizing first, second, third, and fourth solenoids 30, 34, 38, and 42, control device 88 controls the rate and direction of fluid flow into and out of first and second chambers 56 and 58 of hydraulic actuator 12.

As shown in FIG. 1, a spool position sensor 45 may be operatively engaged with each of first, second, third, and fourth metering valves 22, 24, 26, 28. Each spool position sensor 45 detects the actual position of the spool within the respective metering valve. The measured position of each spool may be transmitted to control device 88. Control device 88 may use this feedback to more accurately control the flow rate of fluid though each of first, second, third, and fourth metering valves 22, 24, 26, 28.

Control device 88 is connected to control lever 84. Control device 88 may be connected to control lever 84 through control line 86 or through another connection such as for example, a remote control 85 or and automatic control. An operator manipulates control lever 84 to control the motion of load 14. The operator may move control lever 84 to a first operative position to move load 14 in the first direction (as indicated by arrow 66). In response, control device 88 energizes the appropriate solenoid, or solenoids, to connect first chamber 56 with pump 18 and second chamber 58 with tank 20. This configuration results in the movement of load 14 in the first direction.

The operator may also move control lever 84 to a second operative position to move load 14 in the second direction (as indicated by arrow 68). In response, control device 88 energizes the appropriate solenoid, or solenoids, to connect second chamber 58 with pump 18 and first chamber 56 with tank 20. This configuration results in the movement of load 14 in the second direction.

In addition, the operator may move control lever 84 to a neutral position to stop the motion of load 14 or to prevent load 14 from moving. In response, control device 88 de-energizes all solenoids so that electro-hydraulic valve arrangement 16 returns to a closed position to prevent fluid from flowing into or out of hydraulic actuator 12.

As illustrated in FIG. 1, control device 88 is also connected to first pressure sensor 70 through control line 76, first chamber pressure sensor 72 through control line 78, and second chamber pressure sensor 74 through control line 80. Each pressure sensor provides control device 88 with a sensed pressure. In the currently contemplated embodiment, each pressure sensor provides a sensed pressure to control device 88 on a periodic basis, such as every 5 ms.

INDUSTRIAL APPLICABILITY

The operation of the aforementioned system will now be described with reference to the attached drawings. An exemplary method 110 for controlling electro-hydraulic valve arrangement 12 is presented in the flowchart of FIG. 2. Method 110 may be implemented in the system, for example, by an application stored in the memory of the computer of control device 88.

Figure 2:
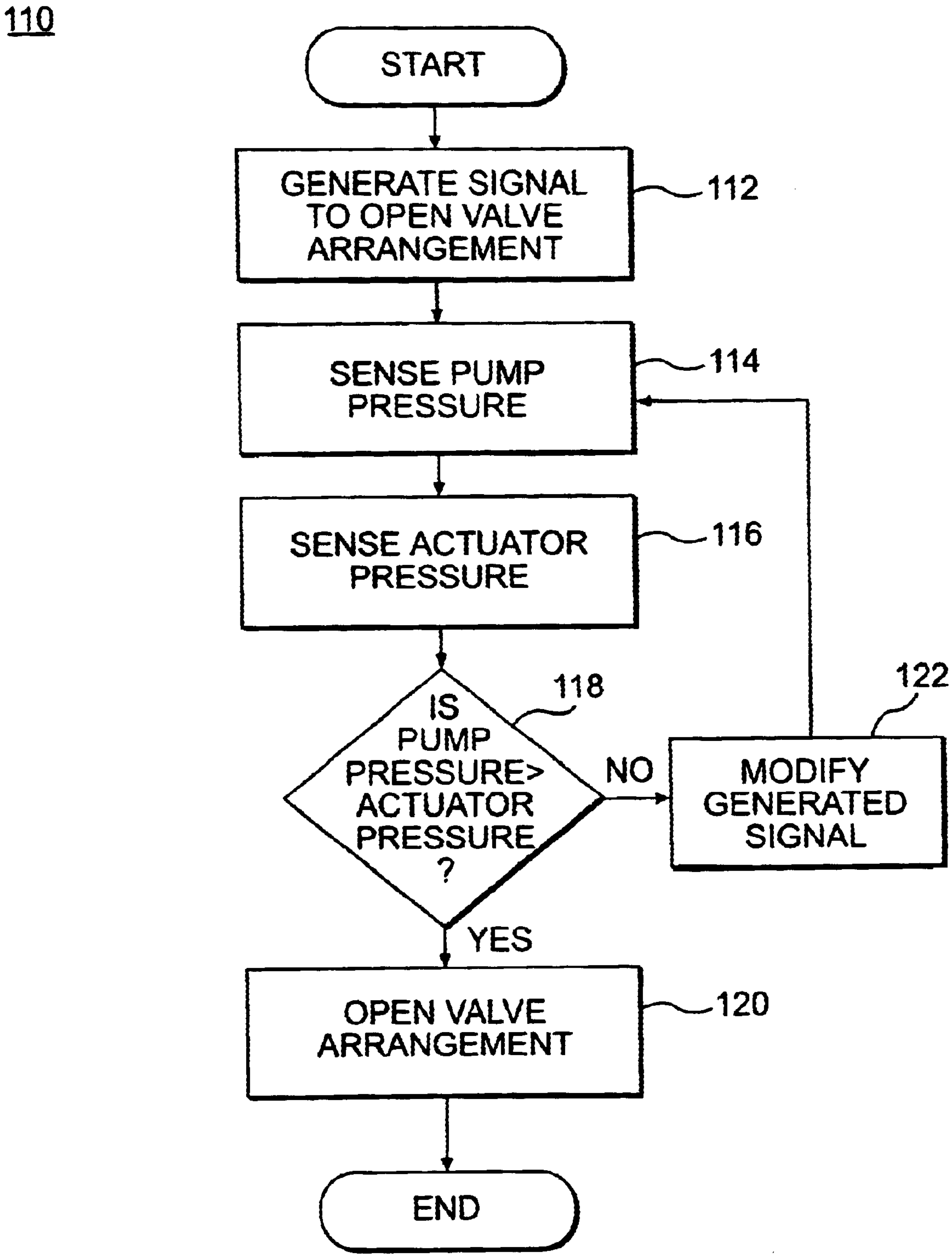
FIG. 2 is a first embodiment of a flowchart illustrating a process for controlling the electro-hydraulic valve arrangement of FIG. 1.

With reference to FIG. 1, when an operator moves control lever 84 to either a first operative position or a second operative position to move hydraulic actuator 12 in either the first direction (as indicated by arrow 66) or the second direction (as indicated by arrow 68), a signal is generated to open electro-hydraulic valve arrangement 16 (step 112 of FIG. 2). The generated signal may be electronic or mechanical.

Control device 88 determines the pump pressure ($P_p$) (step 114). The pump pressure ($P_p$) may be determined by sensing the pressure of the fluid between pump 18 and electro-hydraulic valve arrangement 16 through a sensor, such as first pressure sensor 70. The pump pressure ($P_p$) may be sensed on a periodic basis, such as every 5 ms. Alternatively, the pump pressure ($P_p$) may be sensed only upon receipt of a signal to open electro-hydraulic valve arrangement 16. The pump pressure ($P_p$) may also be determined by reference to a representative pump pressure, such as, for example, the standard operating pressure or stand-by pressure of the pump, that is stored in the memory of control device 88.

Control device 88 also reads the actuator pressure ($P_a$) as sensed by either the first chamber pressure sensor 72 or second chamber pressure sensor 74 (step 116). The actuator pressure ($P_a$) may be sensed on a periodic basis, such as every 5 ms. Alternatively, the actuator pressure ($P_a$) may be sensed only upon receipt of a signal to open electro-hydraulic valve arrangement 16.

Control device 88 compares the pump pressure ($P_p$) to the actuator pressure ($P_a$) for the chamber to which pump 18 is to be connected, i.e. the pressure of first chamber 56 if hydraulic actuator 12 is to be moved in the first direction (as indicated by arrow 66) or the pressure of second chamber 58 if hydraulic actuator 12 is to be moved in the second direction (as indicated by arrow 68). If the pump pressure ($P_p$) is less than the actuator pressure ($P_a$) for the respective chamber, control device 88 will modify the signal provided by the control lever (i.e. the generated signal) to prevent electro-hydraulic valve arrangement 16 from opening (step 122).

If the pump pressure ($P_p$) is greater than the actuator pressure ($P_a$) for the respective chamber, control device 88 will open electro-hydraulic valve arrangement 16 (step 120). Opening electro-hydraulic valve arrangement 16 places pump 18 in fluid connection with the respective chamber of hydraulic actuator 12 to move actuator 12 in the desired direction.

After electro-hydraulic valve arrangement 16 is opened, control device 88 may continue to monitor both the pump pressure ($P_p$) and the actuator pressure ($P_a$). If the pump pressure ($P_p$) drops below the actuator pressure ($P_a$), control device 88 will immediately close electro-hydraulic valve arrangement 16 to prevent an undesirable reverse flow of fluid.

It is also contemplated that control device 88 may account for inaccuracies in the pressure sensors. Because pressure sensors do not always provide an accurate pressure reading, a variable, such as pressure offset ($P_o$), may be included to compensate for any possible error in the pressure readings. A pressure drop calculation including the pressure offset is as follows:

$$\text{Pressure Difference} = P_p - P_a P_o$$

As will be understood from this equation, the inclusion of the pressure offset ($P_o$) provides a safety margin. In the currently contemplated embodiment, the value of the pressure offset ($P_o$) is based on the specified margin of error for the pressure sensors. The value of the pressure offset should be approximately equal to the sum of the margin of error for the pump pressure sensor and one of the first and second chamber pressure sensors. By subtracting the pressures offset ($P_o$) in the pressure difference calculation, control device 88 ensures that the pump pressure ($P_p$) exceeds the actuator pressure ($P_a$) by at least the margin of error for the pressure sensors providing the values of the pump pressure and the actuator pressure.

By preventing electro-hydraulic valve arrangement 16 from opening and closing electro-hydraulic valve arrangement 16 when the pump pressure ($P_p$) is less than the actuator pressure ($P_a$), a reverse flow of fluid, where fluid flows from either first chamber 56 or second chamber 58 through electro-hydraulic valve arrangement 16 towards pump 18, is prevented. If reverse flow was allowed, an undesirable movement of load 14 may occur. Thus, by controlling the position of electro-hydraulic valve arrangement 16 based on the pump pressure ($P_p$) and the actuator pressure ($P_a$), control device 88 performs a pump check function. This eliminates the need to include a separate mechanical check valve between pump 18 and electro-hydraulic valve arrangement 16.

Figure 3:
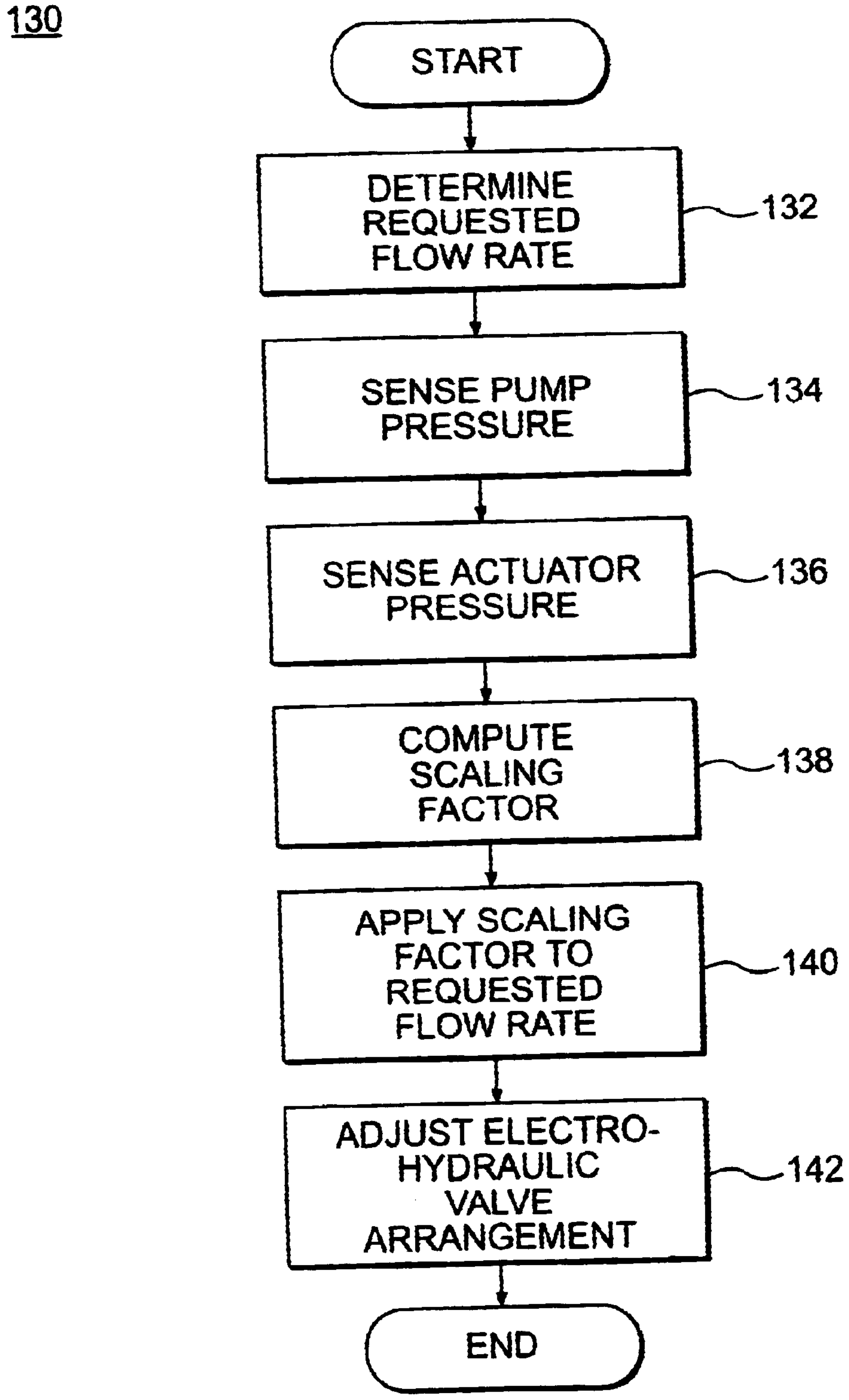
FIG. 3 is a second embodiment of a flowchart illustrating a process for controlling the electro-hydraulic valve arrangement of FIG. 1.

Another exemplary process 130 for controlling electro-hydraulic valve arrangement 16 is illustrated in the flowchart of FIG. 3. When the operator moves control lever 84 to generate movement of hydraulic actuator 12, control device 88 determines a requested flow rate of fluid into and out of first and second chambers 56 and 58 of hydraulic actuator 12 (step 132). As will be appreciated by one skilled in the art, the flow rate determination will be based on system parameters and requirements, such as, for example, chamber size, pump specifications, and actuator speed.

Control device 88 receives the sensed pump pressure ($P_p$) (step 134) and the sensed actuator pressure ($P_a$) (step 136) as described previously. Control device 88 then computes a scaling factor (step 138). The scaling factor calculation is based on the difference between the pump pressure ($P_p$) and the actuator pressure ($P_a$). The scaling factor is a value between 0 and 1 that represents the percentage of the requested flow rate that should be provided to the actuator given the current state of the hydraulic system.

A scaling factor of 0 indicates that the electro-hydraulic valve should be closed, i.e. the pump pressure ($P_p$) is less than the actuator pressure ($P_a$). A scaling factor of 1 indicates that the pump pressure ($P_p$) is sufficient to fully meet the system needs and the electro-hydraulic valve arrangement should be opened to provide an actual flow rate that is equal to the requested flow rate. A scaling factor of between 0 and 1 indicates that the pump pressure is marginally greater than the actuator pressure and some, but not all, of the system requirements may be met. Accordingly, the electro-hydraulic valve arrangement should be opened to provide an actual flow rate that is less than the requested flow rate. In this way, the computed scaling factor provides for limited flow under some operating conditions in a manner analogous to a mechanical check valve being partially opened.

The following formula may be used to determine the scaling factor ($F_s$):

$$F_S=K_p*(P_p-P_a)$$

where, $K_p$ is a constant that represents the minimum pressure difference between the pump pressure and the actuator pressure that is necessary to meet all of the requirements of the system. $K_p$ is dependent upon the particular system requirements and on the type of electro-hydraulic valve arrangement being controlled. In the currently contemplated embodiment, $K_p$ is the reciprocal of this minimum pressure difference. For example, if the specifications of a particular system indicate that the pressure difference between the pump pressure and the actuator pressure be at least 100 kPa (14.5 psi) before the electro-hydraulic valve arrangement can meet all of the needs of the system, $K_p$ will be equal to 1/100 or 0.01.

As will be apparent from the calculation and description above, the computed value of $F_s$ may be greater than 1 in the situation where the pump pressure ($P_p$) is much greater than the actuator pressure ($P_a$). In addition, the above calculation may yield a result that is less than 0 when the pump pressure ($P_p$) is less than the actuator pressure ($P_a$). Because the scaling factor must be limited to a value between 0 and 1, a computed value of $F_s$ that is less than 0 means that a scaling factor of 0 should be applied to the requested flow rate and a computed value of $F_s$ that is greater than 1 means that a scaling factor of 1 should be applied to the requested flow rate.

The computation of $F_s$ may include a feedback component that accounts for the response time of the electro-hydraulic valve arrangement. The following formula may be used to account for the responsiveness of the electro-hydraulic valve.

$$F_s=K_p*(P_p-P_a)+K_d[(P_p-P_a)-(P_p-P_a)_{(-1)}]$$

where, $K_d$ is a constant that indicates the responsiveness of the particular electro-hydraulic valve arrangement being controlled and $(P_p-P_a)_{(-1)}$ is the previous sample of the pressure difference between the pump pressure and the actuator pressure. By including this component, the computation of $F_s$ will take into account the rate of change of the pressure difference between the pump pressure ($P_p$) and the actuator pressure ($P_a$).

After the scaling factor has been computed, control device 88 applies the scaling factor to the requested flow rate to determine an actual flow rate that the system is capable of providing to the actuator (step 140). This is accomplished by multiplying the requested flow rate by the scaling factor. If the scaling is 0, the actual flow rate will be 0. If the scaling factor is 1, the actual flow rate will be equal to the requested flow rate. Control device 88 then adjusts the position of electro-hydraulic valve arrangement 16 to provide the actual flow rate to hydraulic actuator 12 (step 142).

Thus, the present invention has wide applications in a variety of machines incorporating hydraulic actuators. The present invention may provide advantages in that it provides a cost effective and highly efficient system and method for controlling an electro-hydraulic valve arrangement to perform the pump check function.

It will be apparent to those skilled in the art that various modifications and variations can be made in the method and system for controlling an electro-hydraulic valve arrangement without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method of controlling an electro-hydraulic valve arrangement disposed in fluid connection between a source of pressurized fluid and an actuator, comprising:

receiving a signal to open the electro-hydraulic valve arrangement to provide a flow of fluid from the source of pressurized fluid to the actuator;

determining a source pressure representative of the pressure of fluid between the source of pressurized fluid and the electro-hydraulic valve arrangement;

determining an actuator pressure representative of the pressure of the fluid between the electro-hydraulic valve arrangement and the actuator modifying the received signal to prevent the electro-hydraulic valve arrangement from opening when the source pressure is less than the actuator pressure to prevent a reverse flow of fluid from the actuator to the source of pressurized fluid; and modifying the received signal to close the electro-hydraulic valve arrangement when the source pressure drops below the actuator pressure.

2. The method of claim 1, wherein the source pressure is determined by sensing the pressure of the fluid between the source of pressurized fluid and the electro-hydraulic valve arrangement and the actuator pressure is determined by sensing the pressure of the fluid between the electro-hydraulic valve arrangement and the actuator.

3. A method of controlling an electro-hydraulic valve arrangement disposed in fluid connection between a source of pressurized fluid and an actuator, comprising:

receiving a signal to open the electro-hydraulic valve arrangement to provide a flow of fluid from the source of pressurized fluid to the actuator;

determining a source pressure representative of the pressure of fluid between the source of pressurized fluid and the electro-hydraulic valve arrangement;

determining an actuator pressure representative of the pressure of the fluid between the electro-hydraulic valve arrangement and the actuator;

modifying the received signal to prevent the electro-hydraulic valve arrangement from opening when the source pressure is less than the sum of the actuator pressure and a safety margin to prevent a reverse flow of fluid from the actuator to the source of pressurized fluid.

4. A method of controlling an electro-hydraulic valve arrangement disposed in fluid connection between a source of pressurized fluid and an actuator, comprising the steps of:

determining a requested flow rate of fluid to be provided to the actuator based on load conditions;

determining a source pressure representative of the pressure of fluid between the source of pressurized fluid and the electro-hydraulic valve arrangement;

determining an actuator pressure representative of the pressure of the fluid between the electro-hydraulic valve arrangement and the actuator;

computing a scaling factor based on the difference between the source pressure and the actuator pressure;

applying the scaling factor to the requested flow rate to determine an actual flow rate of fluid to provide to the actuator; and adjusting the electro-hydraulic valve arrangement to a position where the actual flow rate of fluid is provided to the actuator.

5. The method of claim 4, wherein the computed scaling factor is between 0 and 1.

6. The method of claim 5, wherein the electro-hydraulic valve arrangement is adjusted to a closed position in response to a scaling factor of 0.

7. The method of claim 5, wherein the actual flow rate is equivalent to the requested flow rate when the scaling factor is 1.

8. The method of claim 4, further including the step of determining the source pressure and actuator pressure on multiple occasions as a function of time.

9. The method of claim 8, wherein the step of computing the scaling factor is further based on the rate of change of the pressure difference between the source pressure and actuator pressure over time.

10. The method of claim 4, wherein the step of computing the scaling factor includes applying a safety margin to account for a margin of error in the determining of the source and actuator pressures.

11. A system for controlling a hydraulic actuator, comprising:

a hydraulic actuator;

a source of pressurized fluid;

an electro-hydraulic valve arrangement in fluid connection with the source of pressurized fluid and the hydraulic actuator and operable to control a flow rate of fluid from the source of pressurized fluid to the hydraulic actuator;

a first pressure sensor operable to sense a source pressure representative of the pressure of the fluid between the source of pressurized fluid and the electro-hydraulic valve arrangement;

a second pressure sensor operable to sense an actuator pressure representative of the pressure of the fluid between the electro-hydraulic valve arrangement and the hydraulic actuator; and a control device for controlling the electro-hydraulic valve arrangement, the control device operable to receive a signal to open the electro-hydraulic valve arrangement and prevent the electro-hydraulic valve arrangement from opening when the source pressure is less than the actuator pressure, wherein the control device is further operable to close the electro-hydraulic valve arrangement when the source pressure drops below the actuator pressure.

12. A system for controlling a hydraulic actuator, comprising:

a hydraulic actuator including a first chamber and a second chamber;

a source of pressurized fluid;

an electro-hydraulic valve arrangement in fluid connection with the source of pressurized fluid and the hydraulic actuator and including a series of independent metering valves adapted to control a flow of fluid into and out of the first and second chambers of the hydraulic actuator;

a first pressure sensor operable to sense a source pressure representative of the pressure of the fluid between the source of pressurized fluid and the electro-hydraulic valve arrangement;

a second pressure sensor operable to sense an actuator pressure representative of the pressure of the fluid between the electro-hydraulic valve arrangement and the hydraulic actuator; and a control device for controlling the electro-hydraulic valve arrangement, the control device operable to receive a signal to open the electro-hydraulic valve arrangement and prevent the electro-hydraulic valve arrangement from opening when the source pressure is less than the actuator pressure.

13. The system of claim 12, further including a control lever operable to generate the signal to open the electro-hydraulic valve arrangement.

14. The system of claim 12, wherein the source of pressurized fluid is a pump.

15. A system for controlling a hydraulic actuator, comprising:

a hydraulic actuator;

a source of pressurized fluid;

an electro-hydraulic valve arrangement in fluid connection with the source of pressurized fluid and the hydraulic actuator and operable to control a flow rate of fluid from the source of pressurized fluid to the hydraulic actuator;

a first pressure sensor operable to sense a source pressure representative of the pressure of the fluid between the source of pressurized fluid and the electro-hydraulic valve arrangement;

a second pressure sensor operable to sense an actuator pressure representative of the pressure of the fluid between the electro-hydraulic valve arrangement and the hydraulic actuator;

a control device for controlling the electro-hydraulic valve arrangement, the control device operable to receive a signal to open the electro-hydraulic valve arrangement and prevent the electro-hydraulic valve arrangement from opening when the source pressure is less than the actuator pressure; and a remote control operable to generate the signal to open the electro-hydraulic valve arrangement.

16. A system for controlling a hydraulic actuator, comprising:

a hydraulic actuator;

a source of pressurized fluid;

an electro-hydraulic valve arrangement in fluid connection with the source of pressurized fluid and the hydraulic actuator and operable to control a flow rate of fluid from the source of pressurized fluid to the hydraulic actuator;

a first pressure sensor operable to sense a source pressure representative of the pressure of the fluid between the source of pressurized fluid and the electro-hydraulic valve arrangement;

a second pressure sensor operable to sense an actuator pressure representative of the pressure of the fluid between the electro-hydraulic valve arrangement and the hydraulic actuator; and a control device for controlling the electro-hydraulic valve arrangement, the control device operable to receive a signal to open the electro-hydraulic valve arrangement to provide a requested fluid flow, the control device further operable to compute a scaling factor based on the difference between the source pressure and the actuator pressure and to open the electro-hydraulic valve arrangement to provide an actual fluid flow based on the application of the scaling factor to the requested fluid flow.

17. The system of claim 16, wherein the hydraulic actuator includes a first chamber and a second chamber and the electro-hydraulic valve arrangement includes a series of independent metering valves adapted to control the flow of fluid into and out of the first and second chambers.

18. The system of claim 16, further including a remote control operable to generate the signal to open the electro-hydraulic valve arrangement.

* * * * *